(12) United States Patent
Liu et al.

(10) Patent No.: US 9,513,496 B2
(45) Date of Patent: Dec. 6, 2016

(54) OPTICAL FIBER ROTARY SQUEEZER POLARIZATION CONTROLLER

(71) Applicant: Andol Technology, Inc., Nanjing, Jiangsu (CN)

(72) Inventors: Deguang Liu, Jiangsu (CN); Yifei Qian, Jiangsu (CN); Yihua Zhang, Jiangsu (CN)

(73) Assignee: Andol Technology, Inc., Nanjing (CN)

( * ) Notice: Subject to any disclaimer, the term of this patent is extended or adjusted under 35 U.S.C. 154(b) by 0 days.

(21) Appl. No.: 14/763,846

(22) PCT Filed: Aug. 29, 2014

(86) PCT No.: PCT/CN2014/085473
§ 371 (c)(1),
(2) Date: Jul. 28, 2015

(87) PCT Pub. No.: WO2015/070658
PCT Pub. Date: May 21, 2015

(65) Prior Publication Data
US 2016/0070124 A1    Mar. 10, 2016

(30) Foreign Application Priority Data

Nov. 13, 2013    (CN) .......................... 2013 2 0714193

(51) Int. Cl.
*G02B 6/00* (2006.01)
*G02F 1/01* (2006.01)
(Continued)

(52) U.S. Cl.
CPC .......... *G02F 1/0134* (2013.01); *G02B 6/2766* (2013.01); *G02B 6/389* (2013.01); *G02F 1/0136* (2013.01); *G02B 6/3898* (2013.01)

(58) Field of Classification Search
CPC ..... G02F 1/0134; G02F 1/10136; G02B 6/389
(Continued)

(56) References Cited

U.S. PATENT DOCUMENTS 5,654,823 A * 8/1997 Sakamoto ................ G02B 7/10
                                                              359/368
6,644,419 B1 * 11/2003 Chen ......................... B25F 5/00
                                                              173/168
(Continued)

FOREIGN PATENT DOCUMENTS

CN    202339422    7/2012
CN    202351449    7/2012
(Continued)

OTHER PUBLICATIONS

International Search Report of PCT/CN2014/085473 dated Nov. 26, 2014, 2 pages.
(Continued)

*Primary Examiner* — Ellen Kim
(74) *Attorney, Agent, or Firm* — Rankin, Hill & Clark LLP

(57) ABSTRACT

An optical fiber rotary squeezer polarization controller, comprising a base, a left bracket and a right bracket respectively mounted at both ends of the base, characterized in that a shaft is rotatably mounted between the left bracket and the right bracket, the shaft having a through channel cut therein lengthwise for placement of an optical fiber, the shaft further being mounted with a squeezing apparatus corresponding to the channel. The present invention has altered the means by which an optical fiber is fixed onto the prior-art polarization controllers and has eliminated the clamps at both ends of the optical fiber. The shaft carries the squeezing apparatus to rotate to any desired angles while the optical fiber remains stationary under the effect of its own tension. As the optical fiber extends outwardly from either end of the shaft, it is (Continued)

restrained by its own tension and, therefore, will not rotate along with the shaft. As a result, the twisting damage to the optical fiber caused by its being fixed at both ends and twisting of the optical fiber when it is spun after squeezed which would otherwise occur in the prior art can be thoroughly eliminated. In the absence of twisting damage, it is not necessary to make a large squeezer polarization controller and, therefore, the volume of the squeezer polarization controller can be reduced.

7 Claims, 3 Drawing Sheets

(51) Int. Cl.
*G02B 6/27* (2006.01)
*G02B 6/38* (2006.01)

(58) Field of Classification Search
USPC .................. 385/11, 13, 9, 137, 140; 356/73
See application file for complete search history.

(56) References Cited

U.S. PATENT DOCUMENTS 6,873,783 B1 * 3/2005 Yao ........................ G02B 6/105
 385/11
8,373,852 B2 * 2/2013 Ruchet .................. G02B 6/274
 250/227.17

FOREIGN PATENT DOCUMENTS

CN 203658691 6/2014
JP 2010197474 A * 9/2010

OTHER PUBLICATIONS

International Search Report of PCT/CN2014/085473 dated Nov. 26, 2014, 2 pages. (English translation).

* cited by examiner

OPTICAL FIBER ROTARY SQUEEZER POLARIZATION CONTROLLER

FIELD OF THE INVENTION

The present invention relates to optical fiber field, and more particularly, to an optical fiber rotary squeezer polarization controller.

BACKGROUND OF THE INVENTION

With increasingly fast transmission rate of fiber-optic communication, the communication system becomes more and more sensitive to a series of damage induced by polarization, for example, polarization mode dispersion generated in the process of transmission. These damages are mainly attributable to the defects of optical fiber itself. In the case of idealized optical fiber, the polarization state is maintained unchanged and the damages caused by polarization effect can be readily eliminated. In contrast, in the case of standard communication optical fiber in practical use, the polarization state of transmitted light is constantly changed due to irregular double refraction caused by for example thermal stress, mechanical stress in optical fiber as well as irregularity of fiber core.

To address this problem, polarization controllers are employed to eliminate such damages and they function to transform any designated polarization states to any desirable ones. Today, the polarization controllers available mainly include manual or electric adjustable polarization controls and 3-paddle fiber polarization controller which, however, are all disadvantageous in that they are large in volume and have unsatisfactory performance. For example, the prior-art 3-paddle controllers have an optical fiber fully secured at both ends. This would lead to twisting of the optical fiber at both ends, causing considerable damages to the optical fiber. Moreover, the prior-art controllers generally squeeze an optical fiber before rotating it, which would result in additional twisting of the optical fiber itself. To mitigate the damage to optical fibers resulting from twisting, the common practice is enlarging the volume of polarization controller thereby reducing the relative twisting length.

SUMMARY OF THE INVENTION

The objective of the present invention is to provide an optical fiber rotary squeezer polarization controller which can eliminate the damage to optical fibers caused by twisting and reduce the size of polarization controllers.

To achieve the objective described above, the present invention employs the technical solutions below:

An optical fiber rotary squeezer polarization controller, comprising a base, a left bracket and a right bracket respectively mounted at both ends of the base, a shaft rotatably mounted between the left bracket and the right bracket, the shaft having a through channel cut therein lengthwise for placement of an optical fiber, the shaft further being mounted with a squeezing apparatus corresponding to the channel.

As an improvement to the present invention, the squeezing apparatus consists of an upper cover, an optical fiber clamp and an adjusting knob, the adjusting knob being disposed in the upper cover which is in turn fixed onto the shaft, the optical fiber clamp being squeezed towards or moved away from the control of the adjusting knob. Further, the squeezing apparatus comprises a spring which is disposed between the adjusting knob and the optical fiber clamp, the adjusting knob varying strain of the spring thereby varying a pressure applied on the optical fiber clamp. To gain increased stability of connection between the spring and the adjusting knob, the squeezing apparatus may further comprise a steel ball which is disposed between the adjusting knob and the spring, the adjusting knob varying strain of the spring via the steel ball.

As a further improvement to the present invention, the squeezing apparatus is implemented as a piezoelectric ceramic actuator which is controlled by electric signals, making it more readily operable.

As a further improvement to the present invention, both the left bracket and the right bracket are provided with a fastening bolt. When the shaft is spun into place, the fastening bolts are used to fasten the shaft securely.

As a further improvement to the present invention, the shaft is driven to spin by an ultrasonic motor. Either end of the shaft is provided with an optical fiber jumper wire which has an interference fit with the shaft. The optical fiber jumper wire allows more convenient connection. The base is provided with one pair of recesses. Both the left bracket and the right bracket are provided with a channel.

The advantageous effects of the present invention are as follows:

The present invention has altered the means by which an optical fiber is fixed onto the prior-art polarization controllers and has eliminated the clamps at both ends of the optical fiber. The shaft carries the squeezing apparatus to rotate to any desired angles while the optical fiber remains stationary under the effect of its own tension. As the optical fiber extends outwardly from either end of the shaft, it is restrained by its own tension and, therefore, will not rotate along with the shaft. As a result, the twisting damage to the optical fiber caused by its being fixed at both ends and twisting of the optical fiber when it is spun after squeezed which would otherwise occur in the prior art can be thoroughly eliminated. In the absence of twisting damage, it is not necessary to make a large squeezer polarization controller and, therefore, the volume of the squeezer polarization controller can be reduced.

DESCRIPTION OF THE PREFERRED EMBODIMENTS

The present invention will be explained in greater detail below with reference to the attached drawings and specific embodiments. However, it is to be understood that the disclosed embodiments are intended to be merely examples rather than to limit the scope of the invention. Through reading the disclosure, those skilled in the art can embody the present invention in various and alternative forms without departing from the scope as limited by the appended claims.

Figure 1:
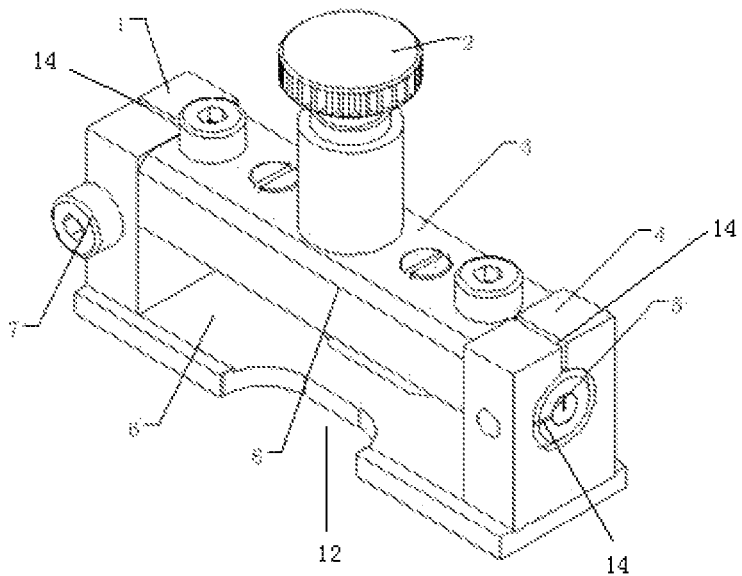
FIG. 1 is a structural schematic view of embodiment 1 of the present invention.
Figure 2:
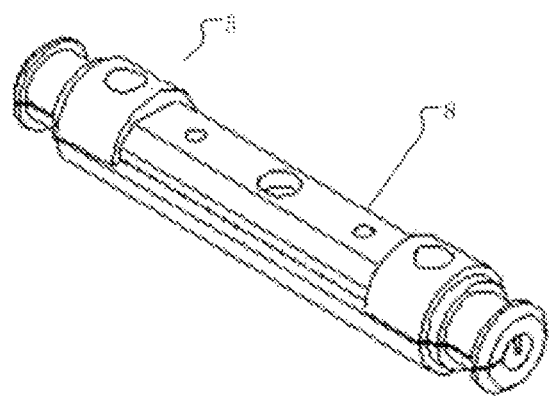
FIG. 2 is a structural schematic view of a shaft in embodiment 1 of the present invention.
Figure 3:
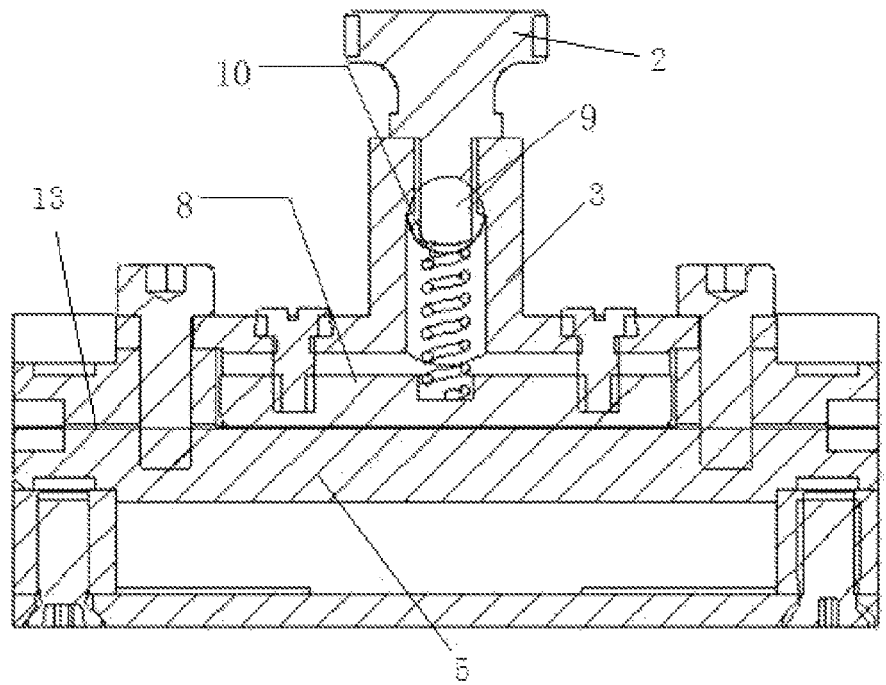
FIG. 3 is a cross-sectional view of embodiment 1 of the present invention.

Embodiment 1:

As shown in FIG. 1, this embodiment comprises a base 6 at the bottom, a pair of diametrically disposed recesses 12 being provided at intermediate portion of the base 6 to securely fix the base 6. A left bracket 1 and a right bracket 4 are vertically disposed at both ends of the base 6 respectively, each having a through hole provided therein to mount a shaft 5. As shown in FIG. 2, the shaft 5 is cylindrically shaped and is mounted into the through holes respectively provided in the left bracket 1 and the right bracket 4. A through channel 13 is provided lengthwise in the shaft 5 for placement of an optical fiber. As can be viewed from FIG. 2 and FIG. 3, only a lower half part is retained at intermediate portion of the shaft 5 and an upper half part corresponding thereto is utilized to mount a squeezing apparatus. The squeezing apparatus consists of an optical fiber clamp 8, an upper cover 3, a spring 10, a steel ball 9 and an adjusting knob 2. The optical fiber clamp 8 is in direct contact with the shaft 8. The upper cover 3 is fixed onto the optical fiber clamp 8 using two bolts at intermediate portion thereof and the both ends of the upper cover 3 are directly fixed onto the shaft 5 using two additional bolts respectively located at the both ends. In this way, the optical fiber clamp 8 cooperate with the shaft 5 to enclose the channel 13 into a closed room having two opened ends which is utilized to contain the optical fiber. As shown in FIG. 3, the upper cover 3 is configured to be T-shaped and the spring 10, the steel ball 9 and the adjusting knob 2 are disposed therein vertically. The adjusting knob 2 joins an end of the upper cover 3 facing upwards through threaded connection. A lower end of the adjusting knob 2 is connected with an end of the spring 10 and the other end of the spring 10 abuts the optical fiber clamp 8. By rotating the adjusting knob 2, one can move the adjusting knob 2 vertically with the aid of threads, which would result in change in elastic strain of the spring 10 via the steel ball 9 and, consequently, cause the pressure applied by the spring 10 onto the optical fiber clamp 8 to vary correspondingly. Such pressure change will cause the optical fiber clamp 8 to squeeze the optical fiber contained in the channel 13 or, conversely, releasing the optical fiber clamp 8 will lead to decease in the pressure applied onto the optical fiber. As before, two bolts disposed at intermediate portion of the upper cover 3 fix the upper cover 3 onto the optical fiber clamp 8. Here, it is worthy noted that, although the spring 10 will drive the optical fiber clamp 8 to move upwards or downwards thereby pressing or releasing the optical fiber, the magnitude of such movement is so tiny that it is totally within the permissible limits of the two bolts at intermediate portion of the upper cover 3.

The optical fiber is contained in the channel 13 and is allowed to rotate in the range of 0-270 degrees. Also, a channel 14 is cut through the left bracket 1, the right bracket 4 and the shaft 5 such that, once the upper cover 3 is removed, an optical fiber can be placed into the channel 13 via the channel 14. In this embodiment, an optical fiber is not fixed at both ends by means of clamps as practiced in the prior-art polarization controllers, but rather it is directly placed into the channel 13, in other words, it extends outwardly from the both ends of the channel 13. As an optical fiber has only a portion thereof disposed in the polarization controller, as the shaft spins, the optical fiber remains stationary in the channel 13 under the effect of its own tension. In addition to being placed through the channel 14, the optical fiber can also be inserted into the channel 13 from one end thereof and led out from the other end. When the shaft 5 carries the squeezing apparatus to rotate about the length of the shaft 5 to a desired angle, it is fastened into place using fastening bolts 7. The fastening bolts 7 are mounted on side surfaces of the left bracket 1 and the right bracket 4 respectively and they are respectively screwed into the left bracket and the right bracket by means of internal threads to press against the both ends of the shaft 5 thereby refrain the shaft 5 from rotating. Once the shaft 5 is fastened, the adjusting knob 2 can be rotated to cause the optical fiber clamp 8 to squeeze the optical fiber. This would result in change in refractive index of the optical fiber in the direction of interest and, consequently, the change in the polarization state. As the shaft 5 carries the squeezing apparatus to rotate in the range of 0-270 degrees without any limitation, any polarization outputs are made possible.

Figure 4:
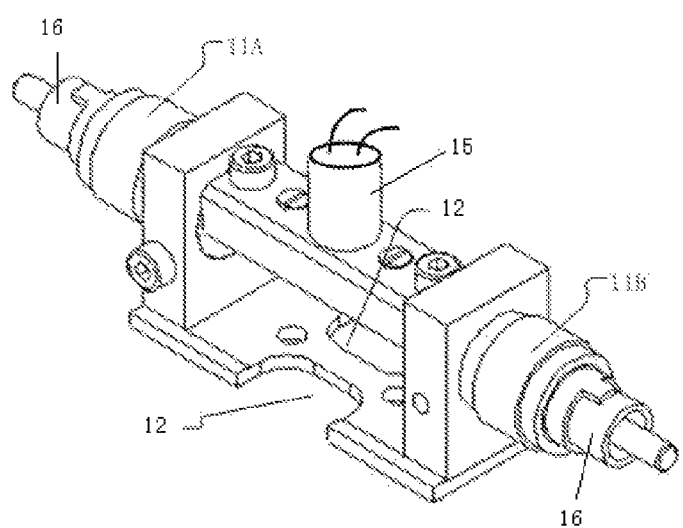
FIG. 4 is a structural schematic view of embodiment 2 of the present invention.

Embodiment 2:

As shown in FIG. 4, the adjusting knob 2 in this embodiment is substituted with a piezoelectric ceramic actuator 15. The piezoelectric ceramic actuator 15 has a lower end in direct contact with an optical fiber contained in the channel 13. Thus, an external electrical circuit instead of a manual adjustment is utilized to squeeze the optical fiber. There are also disposed respectively at both ends of the shaft 5 a first ultrasonic motor 11A and a second ultrasonic motor 11B which serve to control the rotation of the shaft 5 using electrical signals. In this embodiment, an optical fiber is inserted into the channel 13 from one end thereof and led out from the other end. To allow convenient wiring, an optical fiber jumper wire 16 is respectively disposed at both ends of the shaft 5. Due to the additional ultrasonic motors and optical fiber jumper wires 16 disposed at both ends of the shaft 5, it is impossible to place an optical fiber along radial direction of the shaft 5 and, therefore, the channel 14 is eliminated.

Figure 5:
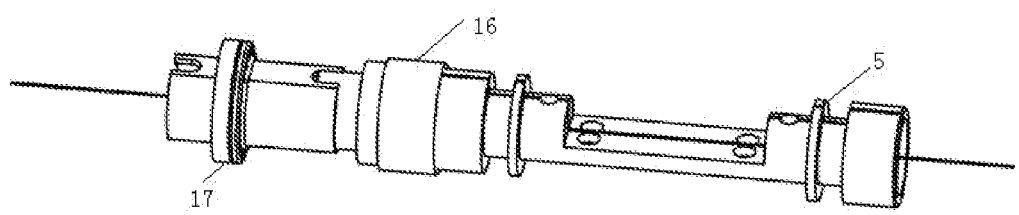
FIG. 5 is a structural schematic view of an optical fiber jumper wire and an adapter in embodiment 2 of the present invention.

As shown in FIG. 5, the optical fiber jumper wire 16 has one end thereof plugged into one end of the shaft 5 by way of interference fit and has the other end thereof plugged into an external adapter 17 by way of interference fit as well. The optical fiber jumper wire 16 in this embodiment is dissimilar from the prior-art optical fiber jumper wires in that a spring disposed therein is eliminated, which not only results in the reduced length of the jumper wire but also is advantageous in that the optical fiber can be prevented from being broken or deformed under the effect of elastic force applied by the spring when it is elongated or twisted. The other aspects of this embodiment are the same as those of embodiment 1.

What is claimed is:

1. An optical fiber rotary squeezer polarization controller, comprising a base, a left bracket and a right bracket respectively mounted at both ends of the base, wherein a shaft is rotatably mounted between the left bracket and the right bracket, the shaft having a through channel cut therein lengthwise for placement of an optical fiber without fiber twisting, the shaft further being mounted with a squeezing apparatus corresponding to the channel, wherein the squeezing apparatus includes an upper cover, an optical fiber clamp and an adjusting knob, the adjusting knob being disposed in the upper cover which is in turn fixed onto the shaft, the optical fiber clamp being squeezed towards or moved away from the channel under the control of the adjusting knob, wherein the squeezing apparatus further includes a spring which is disposed between the adjusting knob and the optical fiber clamp, the adjusting knob varying strain of the spring thereby varying a pressure applied on the optical fiber clamp, and wherein the squeezing apparatus still further includes a steel ball which is disposed between the adjusting knob and the spring, the adjusting knob controlling strain of the spring via the steel ball.

2. The optical fiber rotary squeezer polarization controller as claimed in claim 1, wherein the squeezing apparatus is a piezoelectric ceramic actuator.

3. The optical fiber rotary squeezer polarization controller as claimed in claim 1, wherein both the left bracket and the right bracket are provided with a fastening bolt.

4. The optical fiber rotary squeezer polarization controller as claimed in claim 1, wherein the shaft is driven to spin by an ultrasonic motor.

5. The optical fiber rotary squeezer polarization controller as claimed in claim 1, wherein either end of the shaft is provided with an optical fiber jumper wire which has an interference fit with the shaft.

6. The optical fiber rotary squeezer polarization controller as claimed in claim 1, wherein the base is provided with one pair of recesses.

7. The optical fiber rotary squeezer polarization controller as claimed in claim 1, wherein both the left bracket and the right bracket are provided with a channel.

\* \* \* \* \*